Figure 1:
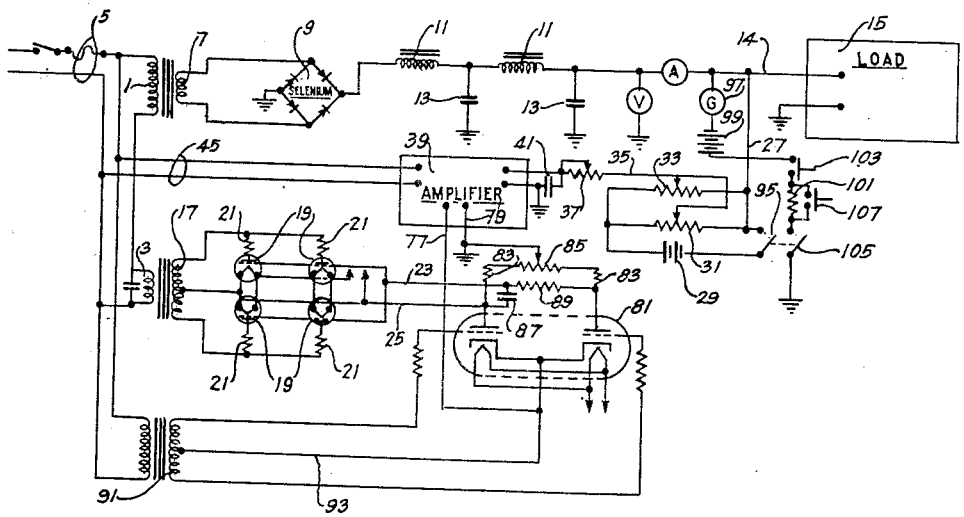

Jan. 5, 1954

R. R. CYR 2,665,405

REGULATED LOW-VOLTAGE POWER SUPPLY

Filed Aug. 16, 1951

INVENTOR.
*Rob Roy Cyr*
BY
*Lippincott & Smith*

ATTORNEYS

Patented Jan. 5, 1954

2,665,405

UNITED STATES PATENT OFFICE 2,665,405

REGULATED LOW-VOLTAGE POWER SUPPLY

Rob R. Cyr, Los Angeles, Calif., assignor to The Regents of the University of California, Berkeley, Calif., a corporation of California Application August 16, 1951, Serial No. 242,116

5 Claims. (Cl. 321—24)

This invention relates to regulated power supplies, and particularly to power supplies adapted to provide, from an alternating current source, direct currents of several amperes at accurately controlled low voltages, as, for example, two or three volts only.

It is well recognized that it is more difficult, with conventional equipment, to supply accurately regulated rectified voltages of low magnitude and with relatively large currents than it is to supply the same amount of power at higher potentials, and that this becomes more difficult where the load varies widely. Various types of scientific equipment, however, particularly measuring equipment, require such low voltage power supplies.

Among the objects of this invention, therefore, are to provide a power supply which will deliver several amperes of direct current at potentials as low as two or three volts with a regulation of one-half of one percent or better and with load variations of plus or minus fifty percent or more from a mean value; to provide a constant voltage power supply wherein the residual alternating current ripple can be held to values of less than ten millivolts R. M. S. to provide a power supply wherein short time fluctuations (less than one second) of the regulated voltage output can be held to less than one percent and long time fluctuations or drifts to less than one-half of this value for at least a twenty-four hour period, and to provide a regulated power supply which will maintain regulation as above specified with variations of input power of plus or minus fifteen percent; e. g., over a range of from one hundred volts to one hundred thirty volts. Other objects are to provide a power supply wherein the output voltage is determined by a comparison or standard voltage derived from a source which is required to supply only a negligible power and which can be compared and adjusted to a primary standard such, for example, as a battery of Eppley standard cells.

Considered broadly the power supply of this invention comprises a pair of transformers having primary windings connected in series, the series circuit including these windings being adapted for connection across any suitable source of supply such as the ordinary sixty cycle commercial mains. Preferably the first of these transformers is of a step-down variety and supplies a conventional rectifier such, for example, as a copper-oxide or a selenium rectifier connected in one of the conventional full-wave circuits, such as a bridge or in push-pull with a center tap. To the output of the rectifier is connected a conventional filter circuit for removing the double frequency ripple from the rectified output.

The second transformer is preferably a step-up device having at least one and preferably a plurality of grid controlled vacuum tubes connected across the secondary as a load. It will be seen that with this connection the voltage of the supply circuit will divide across the two primaries, the voltage across the transformer which feeds the rectifier being dependent upon the load in the output circuit of the second transformer and increasing as the load increases.

Regulation is effected by varying the potentials upon the grids of the load tube or tubes and thereby varying the effective impedance in series with the transformer feeding the rectifier. This is accomplished by comparing the output of the filter with a standard voltage so as to derive an error voltage proportional to the deviation of the filter output from the desired value and varying in sign in accordance with the direction of any such deviation. This error voltage is amplified and a proportional but much greater voltage applied to the control grids of the load tubes in such sense as to decrease the current carried thereby when the filter output voltage rises and to increase the load current when the output voltage falls.

Figure 2:
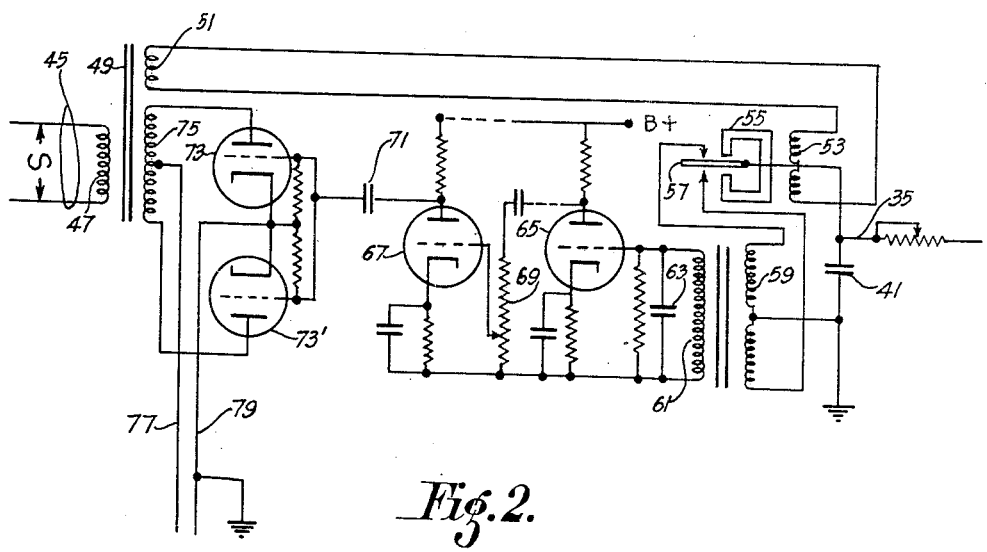

The invention is illustrated in one of its preferred forms by the drawings, in which:

Fig. 1 shows a voltage regulated power supply for supplying a conventionally represented load; and Fig. 2 illustrates, in somewhat simplified form, an amplifier suitable for use as one of the components of the regulated power supply circuit of Fig. 1.

In the embodiment of the invention illustrated in the figures a circuit comprising primary coils 1 and 3 in series is connected across alternating current supply main 5. Primary coil 1 has coupled to it a secondary 7 which feeds a conventional full-wave rectifier 9, shown in this case as being of the bridge type although other well known types of full-wave rectifiers may be used. One of the output terminals of the rectifier net is grounded; the other output terminal connects through a filter comprising series inductance elements 11 and shunt capacity elements 13 and output lead 14 to a load indicated symbolically by the block 15 and thence to ground.

Secondary coil 17, coupled to the primary 3, is preferably of the step-up variety and is center tapped. A load on this secondary is provided by a group of grid controlled vacuum tubes 19. The cathodes of these tubes are preferably connected to the center tap of the secondary coil 17. The plates connect through resistors 21 to the terminals of the secondary winding, the connections being symmetrical so that the plate circuits of the tubes are connected in push-pull parallel across the transformer winding. The grids of all of these tubes are connected in parallel to a lead 23 and the cathodes to a lead 25, so that the potential applied across these leads controls the current through the tubes and therefore the load on the transformer comprising the coils 3 and 17. It may be noted here that a single tube or a pair of tubes may be used in place of the push-pull parallel connection shown but better regulation and better filtering can be secured by using at least two tubes in push-pull. The number of tubes used depends on the power requirements from the supply and the rating of the available tubes.

The potential for exercising this control is an amplified error voltage taken from the output of the rectifier circuits at or near its point of connection to the load 15. The derived circuit wherein this error voltage is developed comprises a lead 27 connecting from the output lead 14 to one end of a potentiometer network which is bridged across a substantially constant potential source such as the battery 29. The network comprises a potentiometer 31, which may conveniently be of about 100,000 ohms resistance, in parallel with a second potentiometer 33 the resistance of which may be of the order of 1 megohm. The movable contacts of the two potentiometers are connected in parallel to a lead 35 which connects in series through a variable protective resistance 37 to the input of a high gain amplifier 39 and thence to ground. A condenser 41 is preferably bridged across the input of the amplifier to minimize transient effects and help to remove any residual ripple which may exist in the rectified output.

The two potentiometers 31 and 33 determine the output voltage supplied by the device. The battery 29 is so poled that the voltage drop in the potentiometers 31 and 33 is in the opposite sense to that produced in the portions of the potentiometer windings included in the circuit between the lead 14 and ground. The movable contacts to the two potentiometers are normally set so as to include approximately equal portions of the two potentiometers in the derived circuit. The movable contact of potentiometer 31 may then be moved to make an approximate or coarse adjustment of a potential from the battery included in the two circuits and the final fine adjustment may be made by moving the contact of potentiometer 33.

When the drop due to the battery current 29 in the common portion of the two potentiometers is equal to the voltage of the line 14 against ground no current will flow in the common circuit and hence no voltage will be applied across the input of the amplifier 39. A rise of potential on the lead 14 will result in a current flowing in one direction while a drop in voltage will cause a current flow in the opposite direction. The voltage drop across the input of the amplifier resulting from this error current produces the error voltage which, amplifier, is applied to the grids of the tubes 19 to control the potential on lead 14 and bring it back to normal.

Various types of amplifiers which are responsive to D. C. input voltages may be used for the amplifier 39 so long as they have the characteristics of high gain and high stability. The ordinary types of D. C. amplifier are subject to drift unless rather elaborate precautions are taken to stabilize them and as a general rule the greater the gain in the amplifier the greater its tendency to drift is likely to be. One suitable form of amplifier for this purpose which largely avoids the tendency to drift and which is relatively simple is the so-called "Brown" amplifier. This type of amplifier inverts the direct voltage input and amplifies it as an alternating voltage.

Such an amplifier is shown in somewhat simplified form in the drawings. A pair of supply leads 45 is connected to the alternating current source in parallel with or derived from the leads 5. These leads feed the primary 47 of a multi-winding transformer 49. A secondary winding 51 on this transformer excites the coils 53 of a vibrating inverter 55, having a polarized armature 57 which vibrates synchronously with the alternations of current in the exciting coil. The input lead 35 is connected to this armature and, as the latter vibrates, alternately to the two ends of a transformer winding 59, the center tap of which connects to ground. Currents due to the error voltage therefore pass alternately and in opposite directions through the two halves of the winding 59 thereby inducing in the secondary coil 61 an alternating potential which is directly proportional to the error voltage.

The secondary 61 is tuned to a 60 cycle frequency by a condenser 63, this arrangement acting as a filter, largely removing the harmonics from the square waveform generated by the mechanical vibrator and delivering a nearly pure sine wave to the grid of a conventional resistance-capacity coupled voltage amplifier 65. The plate of this amplifier may be supplied from a conventional power supply not shown. Furthermore, the tube 65 may be merely the first of several cascaded stages of voltage amplification, as is indicated in the drawing by the dotted connections between this amplifier tube and the next, similarly connected tube 67. Preferably this tube, or at least, one of the tubes in the chain, takes its grid potential from a potentiometer gain control 69.

The output of tube 67 is coupled, through a condenser 71 to the control grids of a pair of power output tubes 73, 73' these grids being connected in parallel. The plates of the tubes 73 and 73' are connected in push-pull relationship to the terminals of a secondary winding 75 on the transformer 49. The output circuit for the amplifier comprises leads 77 and 79, lead 77 connecting to the center tap of the winding 75 and lead 79 being grounded.

From the connections of the output tubes it will be seen that if a constant potential is applied to the grids of the two tubes, as will be the case where no error voltage is imposed upon the input of the amplifier, the output of these two tubes will be the rectified 60 cycle wave, comprising successive ½ cycles of such a wave, all of equal amplitude. If an error voltage exists at the input of the device it will be amplified and will appear upon the grids of the tube 73 as a 60 cycle voltage either in phase or 180° out of phase with the voltage applied to one of the two tubes which may be taken as a reference, say the tube 73. If the voltage is in phase with the anode voltage on tube 73 it will increase the current flowing in the plate circuit of this tube during the ½ cycle when the anode is positive, thereby increasing the current carried by the tube during this interval. During the next ½ cycle, when the plate of tube 73' swings positive, the potential imposed on both grids will have reversed in phase, and the current through tube 73' will be decreased, thereby reducing the amplitude of the ½ cycle during which this latter tube is carrying current. If the error voltage applied to the input of the amplifier be reversed in phase this action will be reversed, the current flowing during the ½ cycle when tube 73 conducts being decreased while that during alternate ½ cycles is increased. There therefore appears across the output leads 77 and 79 a 60 cycle potential component the phase of which is dependent upon the polarity or sign of the input voltage to the amplifier.

The gain of the amplifier should, as has already been stated, be very high. Amplifiers of this type are commercially available having voltage gains as high as $10^6$, such gains, of course, requiring more stages of amplification than are shown in the diagram. From what follows it will be apparent that the greater the gain of the amplifier the more accurate will be the regulation of the power supply as a whole.

The output potential from the leads 77 and 79 is applied to a phase and frequency sensitive detector or discriminator. Such a device could take the form of a mechanical rectifier substantially similar to the vibratory inverter 55. It is preferred, however, to use instead a device such as is shown in the drawing where the purpose is accomplished by electronic means.

In this case lead 77 connects to the cathodes of a dual tube 81. The plates of this tube connect through equal resistors 83 to the terminals of a balancing potentiometer 85. The movable contact of this potentiometer connects to lead 79 and ground. It will thus be seen that the plate potential of the two sections of the tube 81 is supplied by the output of the amplifier. The plate of one section of the tube 81 connects to lead 23 and the grids of tubes 19. The plate of the other section connects through lead 25 to the cathodes of these tubes. A condenser 87 is bridged across leads 23 and 25 and a resistor 89 is inserted between this condenser in the anode of one of the tube sections.

The size of the condenser 87 and the resistor 89 are chosen so as to give a time constant to the combination which is sufficient to smooth out the 60 and 120 cycle ripples which would otherwise appear in the output. Suitable values for these elements are 10 microfarads for the condenser 87 and 330,000 ohms for the resistor 89. These values result in a time constant of about ⅓ second which is ample to smooth out the ripples and still permits the device as a whole to respond with sufficient rapidity in nearly all practical cases.

The two grids of the tube 81 are connected in push-pull to the terminals of a center tapped secondary on a transformer 91, the center tap on this secondary connecting through lead 93 to the cathodes of the tube. The potentials applied to the grids are relatively high—of the order of 250 volts—so that when the grids swing negative the tubes are carried far below cut-off while on the positive swings the effective impedance of the tube sections is very low. The effect of this arrangement is substantially the inverse of that in the output stage of the amplifier. The plates of the two tube sections are supplied in parallel with the rectified 60 cycle output of the amplifier, and if the alternate ½ cycles are of equal amplitude the sections will conduct equally and no resultant charge will appear on the condenser 87. If the successive ½ cycles delivered by the amplifier are of unequal amplitude, however, whichever section of the tube 81 has a positive grid during the ½ cycle of greater amplitude will conduct more than will the other section during the succeeding ½ cycle and a charge, in one direction or the other, will therefore build upon the condenser 87.

The 120 cycle component in the output of the amplifier will produce no overall effect on the condenser charge, the device cancelling out the effects of all even harmonics of the original 60 cycles. The fundamental and odd harmonics, which are generated by the inverter 55, do tend to produce a charge upon the condenser and thus vary the effective impedance of the tubes 19 and the drop across the primary 3. It should be noted, however, that variations in phase of the 60 cycle component as applied to the grids of the tubes 73, 73' and to the plates of the dual tube 81 do have an effect on the output of both of these tubes. The A. C. potentials applied to the plates of tubes 73, 73' and to the grids of tube 81, being derived directly from transformers similarly coupled to the supply lead, will, under normal circumstances, always be in phase. For most satisfactory operation of the device it is important, however, that the inverter 55 and secondary coil 61 of the output transformer for this inverter be so tuned as to bring the voltage as applied to the grids of tubes 73, 73' into proper phase.

As is the case in all devices where a feedback control is utilized there will be some residual variation in output voltage with variations either of load or input potential. In practice, however, this residual error may be made as small as may be desired. For closest regulation over the widest possible range it is desirable that the 60 cycle component of the outputs of the amplifier be zero at a mean or normal load and input voltage. These two values are not necessarily the same; sometimes the input voltage may be much more subject to variations on one side of the norm than on the other and in this case it is desirable to set up the equipment to take care of the expected variations, although this may involve placing some duty upon the amplifier during the greater proportion of its operating time. Normal setting may be adjusted by means of the potentiometer 85 which may be set so that the output of the amplifier is applied unequally to the two sections of the tube 81. When this is done a biasing charge will develop on the condenser 87 even though no error voltage is applied to the amplifier. The normal load imposed by the tubes 19 can therefore be adjusted for the expected conditions when the device is put into operation.

Since the calibration of the device depends upon a comparison of the output voltage with the voltage of the battery 29 the accuracy, in an absolute sense, depends upon the accuracy of this voltage. In practice voltages are defined by comparison with the voltage of standard cells of various types, such as the Eppley standard cell. Such cells deliver their rated potentials only when the current supplied by them is zero and they are not, therefore, suitable for use as standards in such service as is required to the battery 29. For this purpose, therefore, it is preferable to use a battery of some more rugged type as a secondary standard and to calibrate it from time to time against a primary standard. Owing to the high resistance of the potentiometers 31 and 33 the drain on the battery 29 is very small and even an ordinary dry battery or storage battery may be a satisfactory secondary standard if the ambient temperature where the device is operated is reasonably constant, the life of a dry battery when so used being substantially its shelf life. This is particularly true if the battery circuits be opened when the equipment is not in use, as, for example, by a switch 95 which may be interlocked with the main service switch of the device. The voltage delivered by the battery 29 will, however, fall off very gradually and as the battery ages a periodical calibration is therefore necessary. If desired a circuit may be built into the device for effecting this calibration. One type of such circuit comprises a zero center galvanometer 97 connected in series with a battery 99 of standard cells. This battery can be connected to ground through a resistor 101 by depressing the pushbutton 103. A protective switch 105, mechanically interlinked with switch 95 and the primary power switch of the device may be included to prevent damage to the battery by operation of the pushbutton when the device is not in operation. The resistance 101 is made high enough to prevent sufficient drain upon the standard cell battery to cause damage to it even though the voltage of the output may be materially different from that desired. With the pushbutton 103 depressed the coarse and fine potentiometers are successively adjusted until a galvanometer 97 reads zero, or, if the voltage desired is not exactly that of an integral number of standard cells, until the galvanometer reads the required value when considered in series with the resistance of the cells and the resistance 101.

In most scientific instruments it is more important for calibration purposes to know exactly what the supply voltage is than it is to have any specific voltage. Thus in one practical application, where the device was used to supply a large number of Pirani tubes, the output voltage of the power supply was balanced against three Eppley cells, giving a regulated voltage of 3.054 volts, the voltage of each such cell being 1.018. With the voltage adjusted so that the reading of the galvanometer is sensibly zero under the conditions described a final fine adjustment may be made with the resistance 101 shorted out by means of a second pushbutton 107, the fine adjustment potentiometer being varied to correct any resulting deviation of the galvanometer 97 from its central position.

With the device as described experiment has shown that the instrument will maintain its desired output voltage (in this case 3.054 volts), with a long time deviation of not more than 5 millivolts over a period of several months, the secondary standard battery 29 being recalibrated against the primary standard battery 99 approximately once a week. The R. M. S. value of the ripple voltage never exceeded 5 millivolts, and this, of course, could be decreased by more filter sections. Very sudden variations of input voltage or load can cause short term variations in output voltage greater than that mentioned. Such variations are due to the time constant of the integrating circuit comprising condenser 87 and resistor 89 and persist for less than a second. Such short term variations have proved in practice to be not more than double the maximum long term deviations and due to their transient nature are not ordinarily important.

It has already been pointed out that various of the elements of the device as described may be modified or others substituted for them. It is obvious that an amplifier of the D. C. type could be substituted for that described, and its output applied directly to the grids of the tubes 19. Several types of amplifiers are known which convert the D. C. input into an A. C. which is then amplified and which appears in the output in various ways. Such amplifiers may be used if the proper type of discriminator or detector is used with them. It is desired to protect and cover all such modifications as fall within the scope of the following claims:

I claim:
1. A regulated power supply for providing constant direct voltage from a varying voltage alternating source comprising a pair of transformers each comprising primary and secondary coils, a circuit for connection to said source including both of said primary coils in series, a rectifier connected to one of said secondary coils, and an output circuit connected to said rectifier; a load comprising at least one tube having a control grid connected to the other of said secondary coils, and means connected to said control grid for varying said load comprising a circuit derived from said output circuit, means in said derived circuit for comparing the voltage of said output circuit with a standard to provide an error voltage, means for amplifying said error voltage, and connections for applying the amplified voltage to said grid in such sense as to increase or decrease said load coordinately with decrease or increase of potential of said output circuit in comparison with said standard.

2. A power supply in accordance with claim 1 wherein said load varying means comprises means for converting said error voltage into an alternating voltage substantially synchronous with said alternating source and reversing in phase with reversal of polarity of said error voltage, a high gain amplifier fed by said converted error voltage, and a frequency and phase sensitive detector fed by said amplifier, the output of said detector being connected to said grid.

3. A power supply in accordance with claim 1 wherein said load comprises a plurality of tubes each having a cathode, an anode and a control grid, said second-mentioned secondary coil being connected in push-pull relation to the cathodes and anodes of said tubes, and the amplified error voltage being applied to the control grids of said tubes in parallel.

4. A power supply in accordance with claim 1 wherein said load varying means comprises a circuit including a standard potential source, a potentiometer connected to said last-mentioned circuit and said derived circuit and adjustable to balance the voltage of one of said circuits against a portion of the voltage of the other in the common branch of the potentiometer so that the resultant current and voltage drop in said common branch are zero at the desired voltage of said output circuit and are finite and of opposite polarity with opposite deviations from said desired voltage in said output circuit, a high-gain amplifier connected across said common branch of said potentiometer, and output circuits from said amplifier for applying to said grid an amplified voltage corresponding in sign and proportional in magnitude to said resultant voltage.

5. A power supply in accordance with claim 4 wherein said high-gain amplifier includes means for periodically reversing said resultant voltage before amplification to invert the same into an alternating voltage, and including a phase sensitive detector to convert the amplified alternating voltage to a direct voltage corresponding in sign to said resultant voltage.

ROB R. CYR.

References Cited in the file of this patent
UNITED STATES PATENTS

| Number | Name | Date |
|---|---|---|
| 2,085,060 | Young | June 29, 1937 |
| 2,086,594 | Young | July 13, 1937 |
| 2,561,329 | Ahlen | July 24, 1951 |
| 2,577,151 | Potter | Dec. 4, 1951 |
| 2,579,235 | Kerns | Dec. 18, 1951 |